United States Patent [19]

Ottobre et al.

[11] Patent Number: 4,584,658
[45] Date of Patent: Apr. 22, 1986

[54] STABLE SINE WAVE GENERATOR

[75] Inventors: Louis G. Ottobre; András I. Szabó, both of Murrysville, Pa.; Wu-Shi Shung, South Windsor, Conn.

[73] Assignee: Westinghouse Electric Corp., Pittsburgh, Pa.

[21] Appl. No.: 504,118

[22] Filed: Jun. 14, 1983

[51] Int. Cl.[4] .............................................. G06F 1/02
[52] U.S. Cl. ................................................... 364/721
[58] Field of Search ................ 364/718, 721; 328/179, 328/27

[56] References Cited
U.S. PATENT DOCUMENTS

| | | | |
|---|---|---|---|
| 3,657,657 | 4/1972 | Jefferson | 364/721 |
| 3,763,364 | 10/1973 | Deutsch et al. | 364/721 |
| 4,039,806 | 8/1977 | Fredriksson et al. | 364/721 |
| 4,078,192 | 3/1978 | Fultz | 364/721 |
| 4,105,939 | 8/1978 | Culbertson | 307/265 |
| 4,192,007 | 3/1980 | Becker | 364/721 |
| 4,225,936 | 9/1980 | Lesche | 364/718 |
| 4,348,734 | 9/1982 | Dougherty | 364/721 |
| 4,484,296 | 11/1984 | Treise et al. | 364/721 |

*Primary Examiner*—James D. Thomas
*Assistant Examiner*—Dale M. Shaw
*Attorney, Agent, or Firm*—D. Schron

[57] ABSTRACT

A sine wave generator which utilizes a PROM for storing a predetermined bit pattern which is converted to a corresponding pulse waveform generated in response to a very accurate and stable clock pulse. The pulse waveform is shifted to a very exacting voltage level and is filtered by a band-pass filter to derive the desired fundamental frequency sine wave. The amplitude and frequency stable sine wave may be utilized in linear variable differential transformer (LVDT) apparatus for measuring the position of a controlled object such as a turbine valve. The arrangement may also be utilized for generating additional sine waves bearing some predetermined phase relationship with respect to one another for other control or signal processing applications.

13 Claims, 9 Drawing Figures

STABLE SINE WAVE GENERATOR

BACKGROUND OF THE INVENTION

1. Field of the Invention

The invention in general relates to sine wave generators, and particularly to the generation of a frequency and amplitude stable sine wave by digital means.

2. Description of the Prior Art

Many systems such as in the control field require the generation of a reference waveform which is of an extremely precise frequency and amplitude. Many sine wave generators provide an output signal which is subject to frequency or amplitude drift and if used for precise measurement applications, can result in erroneous control signals tending to degrade system operation. More accurate sine wave generators tend to be extremely complex and rather costly.

The present invention provides for a sine wave generator which is precisely controlled in frequency and amplitude by digital techniques in a relatively simple and inexpensive arrangement.

The present invention also finds application in those systems which require two or more precise sine waves which are accurately controlled in phase with respect to one another.

SUMMARY OF THE INVENTION

An ultrastable sine wave generator is provided and includes means for providing clocking pulses derived from an ultrastable source such as a crystal oscillator. A binary counter is responsive to the clocking pulses to provide a corresponding output count indication in response thereto. A memory means such as a read only memory is operable to store and read out a predetermined pattern of binary digits at a plurality of storage locations addressable by said count indication.

Means for sampling the read out binary digits, under control of the clocking pulses, converts the pattern to a corresponding pulse waveform which is then filtered to deliver the fundamental frequency sine wave.

DESCRIPTION OF THE PREFERRED EMBODIMENTS

Figure 1:
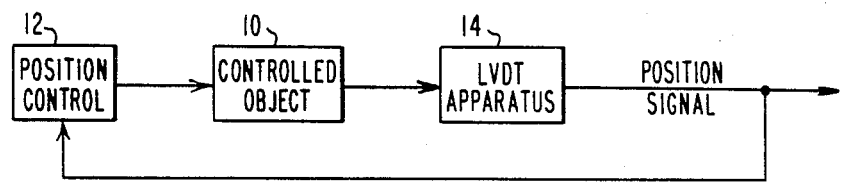
FIG. 1 is a block diagram of a typical control system in which the present invention may be utilized.

Although there are various systems which require very precise relatively low frequency sine wave signals, the present invention will be described by way of example with respect to a typical control system such as illustrated in FIG. 1. The position of a controlled object 10 is precisely governed by position control circuit or system 12 which, in order to provide the correct command for the controlled object 10, must know its exact position. Accordingly, a position sensor is operatively associated with the controlled object to provide such position signal and in the embodiment of FIG. 1 such function is provided by linear variable differential transformer (LVDT) apparatus 14.

The basic system in FIG. 1 is representative of various control systems. By way of example, LVDT apparatus is widely used in the turbine-generator field wherein the flow of a working fluid such as steam is controlled by one or more valves, the precise position of which is required for accurate control purposes.

Figure 2:
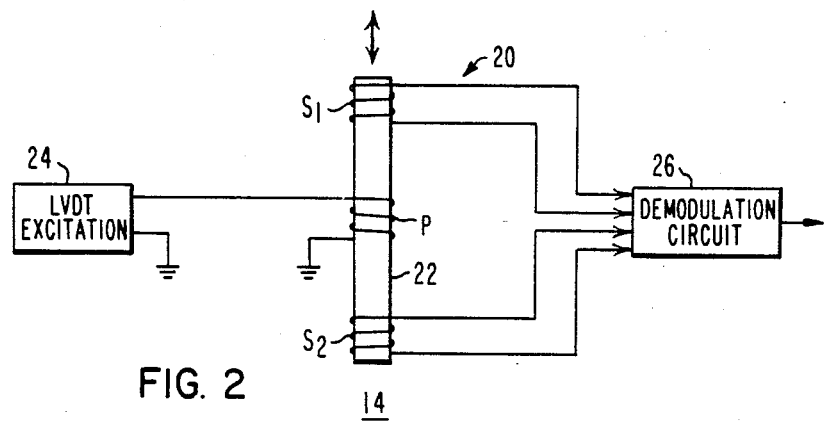
FIG. 2 is a block diagram illustrating one type of position sensor.

A typical LVDT arrangement 14 is illustrated in somewhat more detail in FIG. 2. The apparatus basically includes an LVDT 20 comprised of a central core member 22 of magnetic material and around which is wound a primary winding P and two secondary windings S1 and S2. Core 22 is mechanically coupled to the moveable member such as the controlled valve and is moveable in the direction of the arrow relative to the three windings. An LVDT excitation circuit 24 provides a relatively low frequency sine wave excitation signal to the primary winding P with the apparatus being such that the induced secondary voltages in windings S1 and S2 are equal and opposite to one another when the core member is in mid position. The secondary voltages are provided to a demodulation circuit 26 which basically compares the secondary signals and provides the position signal, indicative of valve position, for control and/or display purposes.

Due to the mechanical coupling, core 22 will move as the valve moves, thus causing an imbalance in the secondary signals provided by windings S1 and S2. The amount of signal unbalance is directly related to the relative position of the core 22, and accordingly, to the relative position of the controlled valve member, with the accurancy of the position signal being directly related to the stability of the sine wave excitation signal provided by LVDT excitation circuit 24. A sine wave generator operable to provide an excitation sine wave of stable frequency and amplitude and which can function as an LVDT excitation circuit is illustrated in FIG. 3, to which reference is now made.

Figure 3:
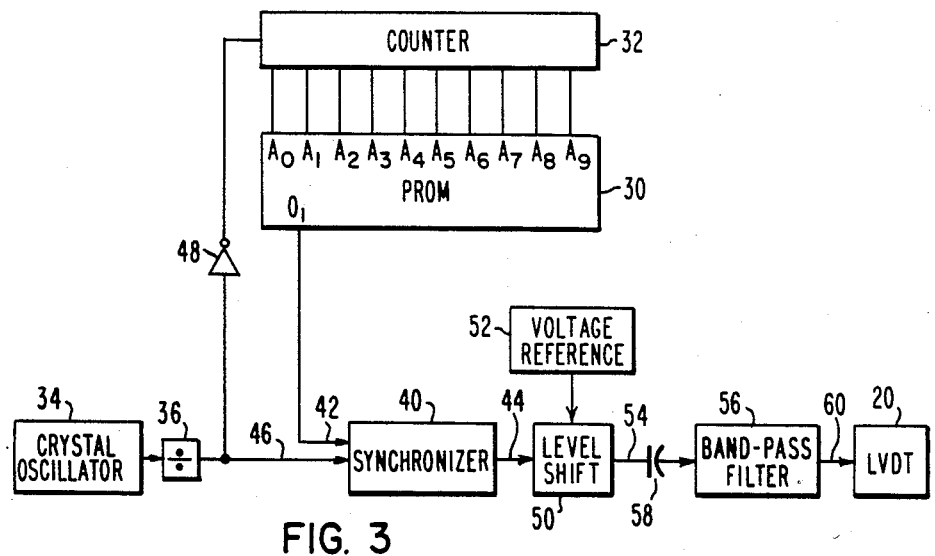
FIG. 3 is a block diagram of one embodiment of the present invention.

The sine wave generator of FIG. 3 utilizes digital techniques and includes a memory means for storing binary digits (ones or zeros) at a plurality of addressable storage locations. One form of memory means which is suitable for this function is a read only memory (ROM) such as a programmable read only memory (PROM) 30, the various storage locations of which are addressed by the output bit pattern of counter 32.

Counter 32 is incremented upon the reception of an input pulse derived from a very stable high frequency source in the form of crystal oscillator 34. If the frequency is too high for the desired purpose, a divider 36 may be provided. The crystals utilized in crystal oscillators such as 34 are relatively inexpensive and are fabricated commerically to produce a desired relatively high frequency which typically is accurate to 20 parts per million over a twenty year period of time.

The output of divider 36 constitutes clocking pulses which are provided not only to counter 32 but to synchronizer 40 which is additionally operable to receive, on line 42, the output of PROM 30. Synchronizer 40 may simply be a D-type flip-flop which samples the input on line 42 and holds it on output line 44 in response to an input clocking pulse on line 46.

Assuming that counter 32 and synchronizer 40 both are activated on the positive transition of an input clock pulse, an inverter 48 is provided so as to ensure that synchronizer 40 reads the PROM output only after a specific location has been addressed, and not during such addressing process.

As will be explained, a certain predetermined bit pattern is stored in PROM 30. By way of example, let it be assumed that PROM 30 is a 1K×4 PROM. This means that the PROM can store 1024 digital words, each word being four bits long. In the embodiment of FIG. 3, only one bit location of each digital word is utilized for the storage of the predetermined bit pattern. For example, the first bit location of each of the 1024 digital words may be collectively utilized to store the bit pattern.

Since there are 1024 addressable locations, counter 32 is designed as a binary counter with 10 output lines connected to 10 respective PROM inputs $A_0$ to $A_9$. Thus in a well-known manner the binary output of counter 32 changes each time a clock pulse is received to thereby address and cause the reading out of successive stored binary bits in PROM 30.

Synchronizer 40 reads the bit outputted from PROM 30 at a precise instant of time dictated by the clock pulse on line 46 provided at a time when the one or zero value from the PROM has stabilized. The synchronizer output on line 44, therefore, is a continous pulse waveform derived from the bit pattern of ones and zeros stored in the PROM 30.

The continuous pulse waveform on line 44 is utilized to derive the desired sine wave output, however, the output voltage level of a typical synchronizer may vary. Although the variation may be slight, it may affect the amplitude of the sine wave output signal, which, as before noted, must be extremely stable in both frequency and amplitude. Accordingly, level shift circuitry 50 is provided to impart amplitude stability. If the pulse waveform on line 44 is high, it will be shifted to a first voltage level as determined by a very accurate and precise voltage reference 52. If the pulse waveform on line 44 is low, it will be shifted to, or maintained at, a second voltage level such as ground. The pulse waveform output on line 54 of level shift circuitry 50 is provided to a band-pass filter 56 after having its DC component removed by capacitor 58 to thereby generate the desired sine wave on output line 60 for excitation of the LVDT 20.

In operation, suppose by way of example, that a low frequency 1000 hertz (Hz) sine wave is desired and that PROM 30 has a storage capability to accommodate 1024 bits. With additional reference to FIG. 4A, waveform 70 illustrates a square wave of period T. For a 1000 Hz signal, the period T equal one millisecond (ms). A Fourier analysis of waveform 70 would reveal that it is made up of a fundamental sine wave having a certain amplitude and a frequency of 1000 Hz, as well as a plurality of odd harmonics of progressively decreasing amplitude. Thus, as is well known, if waveform 70 is provided to a band-pass filter centered around 1000 Hz, an output sine wave signal of 1000 Hz will be provided. Due to the fact that some of the third harmonic will also pass through the band-pass filter, the sine wave will not be perfectly smooth but will have some objectionable ripples superposed on it.

Figure 4:
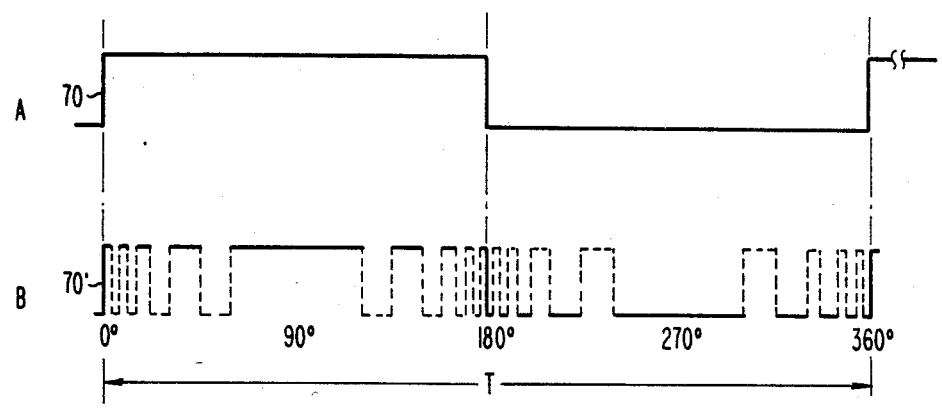
FIG. 4A illustrates a basic square wave signal and FIG. 4B illustrates a modification to that signal.

It is known that to reduce the effects of the third harmonic (as well as other close harmonics) the waveform 70 of FIG. 4A may be modified by providing one or more "notches" within every 90 degree segment of waveform. That is, at periodic locations, the waveform, where previously high, is made low for a short predetermined period of time, and where low, is made high for a short predetermined period of time as illustrated, by the notched waveform 70' of FIG. 4B.

Figure 5:
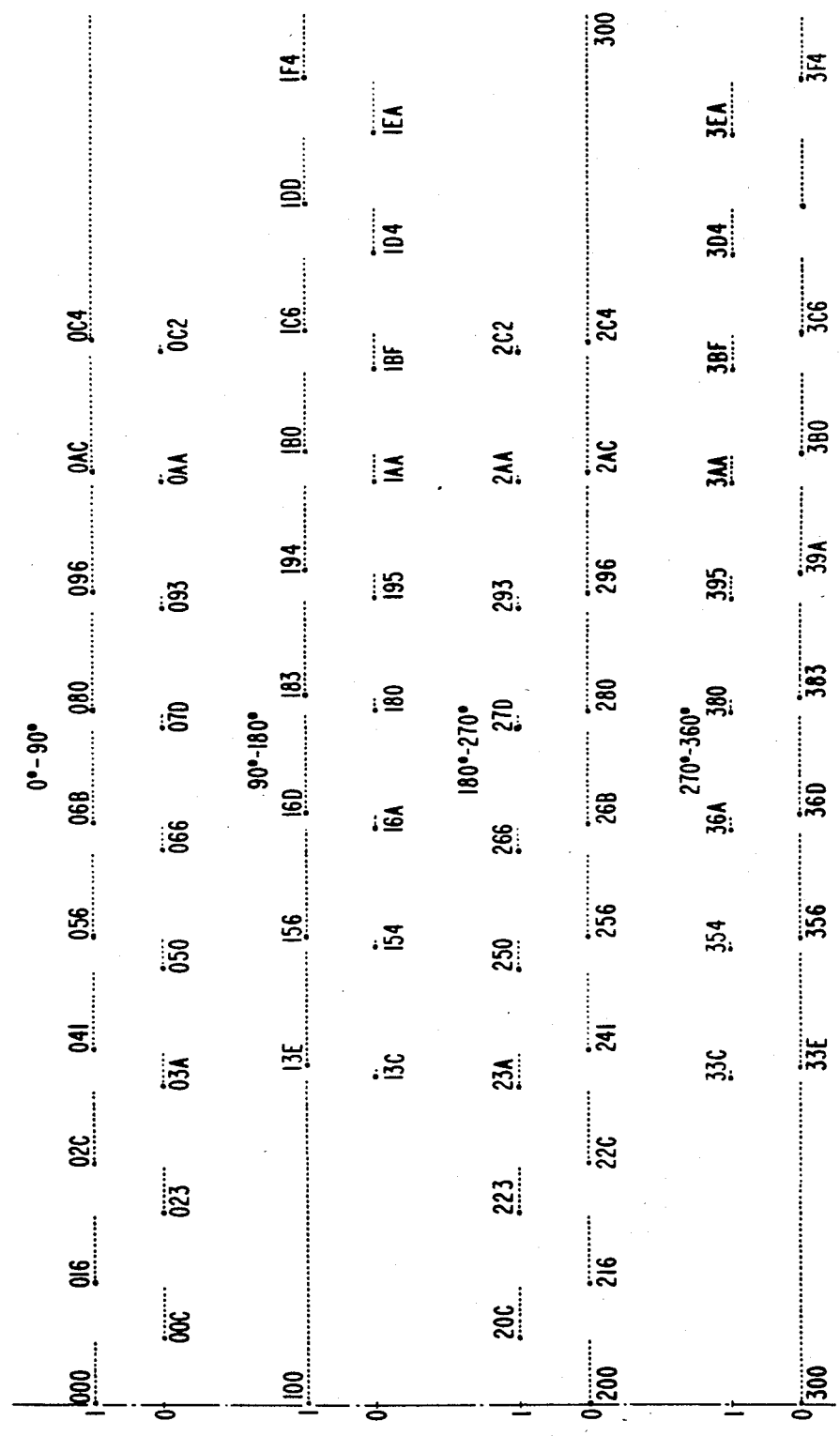
FIG. 5 illustrates the storage of binary information at various addresses of the PROM of FIG. 3.

By way of example, let it be assumed that a 1000 Hz sine wave is desired and that a PROM with 1024 storage locations is available. It may be demonstrated that $Nf_s = f_c$ where N is the number of PROM locations, $f_s$ is the fundamental frequency of the sine wave and $f_c$ is the clock frequency. From the above relationship and for the example given, $f_c$ is determined to be 1.024 megahertz. A notched square wave somewhat similar to that illustrated in FIG. 4B is stored in the PROM 30. More particularly, a basic square wave with nine notches per 90 degree segment is selected and is resolved into 1024 discrete high or low values with each value being stored at a separate one of the 1024 addressable PROM locations as a one or a zero. The one or zero bit values and their corresponding storage location, in hexadecimal code, is illustrated in FIG. 5 wherein the top presentation illustrates the storage locations for the first 90 degrees and with the remaining presentations representing it for subsequent 90 degree increments.

An examination of the presentation reveals that it is symmetrical about 90 degrees for the first half and symmetrical about 270 degrees for the second half. Additionally, the first half from zero to 180 degrees is a mirror image of the second half from 180 to 360 degrees. Storage locations one, zero, zero (100) correspond to 90 degrees, two, zero, zero, (200) to 180 degrees, three, zero, zero, (300) to 270 degrees, and zero, zero, zero (000) to zero or 360 degrees.

Twelve binary ones are stored in successive PROM locations starting with location 000. Thereafter, 10 successive zeros are stored commencing with storage location 00C. Thereafter, commencing with storage location 016, 13 successive ones are stored after which, commencing at location 023, 9 zeros are stored. The pattern continues with successively more ones and less zeros being stored, up to 90 degrees, whereupon the reverse would be true up to storage location 200.

Figure 6:
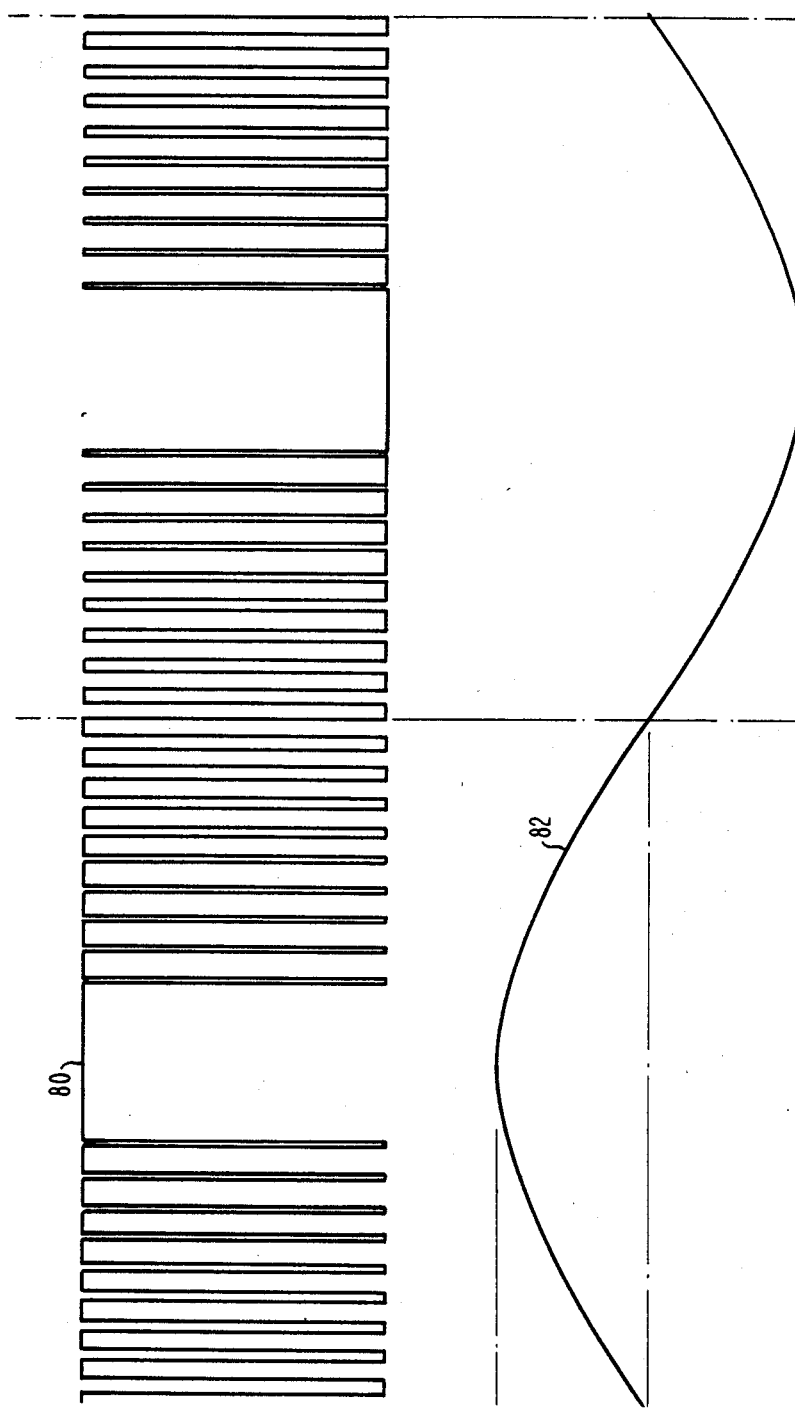
FIGS. 6A and 6B illustrate the waveforms at two different points in the circuit of FIG. 3.

Thus, with each negative going clock pulse from divider 36, counter 32 will increment successive PROM storage locations and with each positive going clock pulse, the synchronizer 40 will transfer the contents of the addressed location to line 44 and provide a continuous pulse waveform which is shifted in voltage level. Waveform 80 of FIG. 6A represents the waveform on line 54 and ranging from a low of zero volts to an unvarying 10 volt voltage level. After level shifting by capacitor 58 and filtering by band-pass filter 56, the resulting sine wave output on line 60 is as illustrated by waveform 82 of FIG. 6B. It is seen that the contents of the PROM 30 has been transformed into one cycle of a corresponding sine wave, and the process is continously repeated to derive a continuous sine wave which is ultrastable not only in frequency but in amplitude as well.

Figure 7:
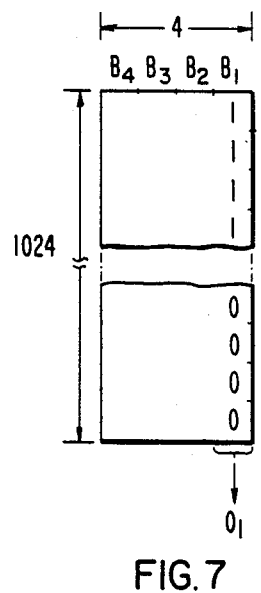
FIGS. 7 and 8 illustrate the storage, and reading out, of binary information in PROM's.

FIG. 7 depicts the storage locations of PROM 30 in FIG. 3. It is seen that there are 1024 words, each word being comprised of four bits, $B_1$ to $B_4$, and in the embodiment of FIG. 3 only bit location $B_1$ of each of the 1024 words is utilized for storing the corresponding bit pattern of the notched square wave. Successive addressing of the 1024 words by counter 32 causes the successive outputting at output $O_1$ of the one or zero stored bits in position $B_1$.

Figure 8:
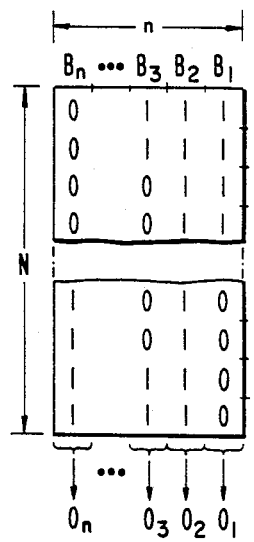

FIG. 8 illustrates the more generalized case of a PROM which includes N words, with each word being comprised of n bits in bit locations $B_1$ to $B_n$. Outputs $O_1$ to $O_n$ are provided for delivering the respective stored bits in locations $B_1$ to $B_n$ when a particular word is addressed. One bit location and one output may be utilized, as in FIG. 3, or as an alternative two or more bit locations and their respective outputs may be utilized for the generation of one or more sine waves. With respect to the generation of a single sine wave utilizing multiple bit positions, the first half of the waveform bit pattern may be stored in bit position $B_1$ while the second half is stored in bit position $B_2$. A switch would deliver the output at $O_1$ to the synchronizer and after all storage locations have been addressed, would switch the output at $O_2$ to the synchronizer. In this manner, the number of bit positions representing a waveform could be doubled thus increasing resolution, or alternatively, a smaller sized PROM could be utilized for the same resolution.

With respect to the generation of multiple sine waves, a bit pattern for a particular sine wave may be stored in bit position $B_1$ and the identical bit pattern may be stored in one or ore of the other bit locations but displaced by a predetermined number of words relative to the first pattern. In this manner, two or more identical sine waves may be produced, each having the same frequency, but displaced in phase relative to one another. An example of such an arrangement is illustrated in FIG. 9.

Figure 9:
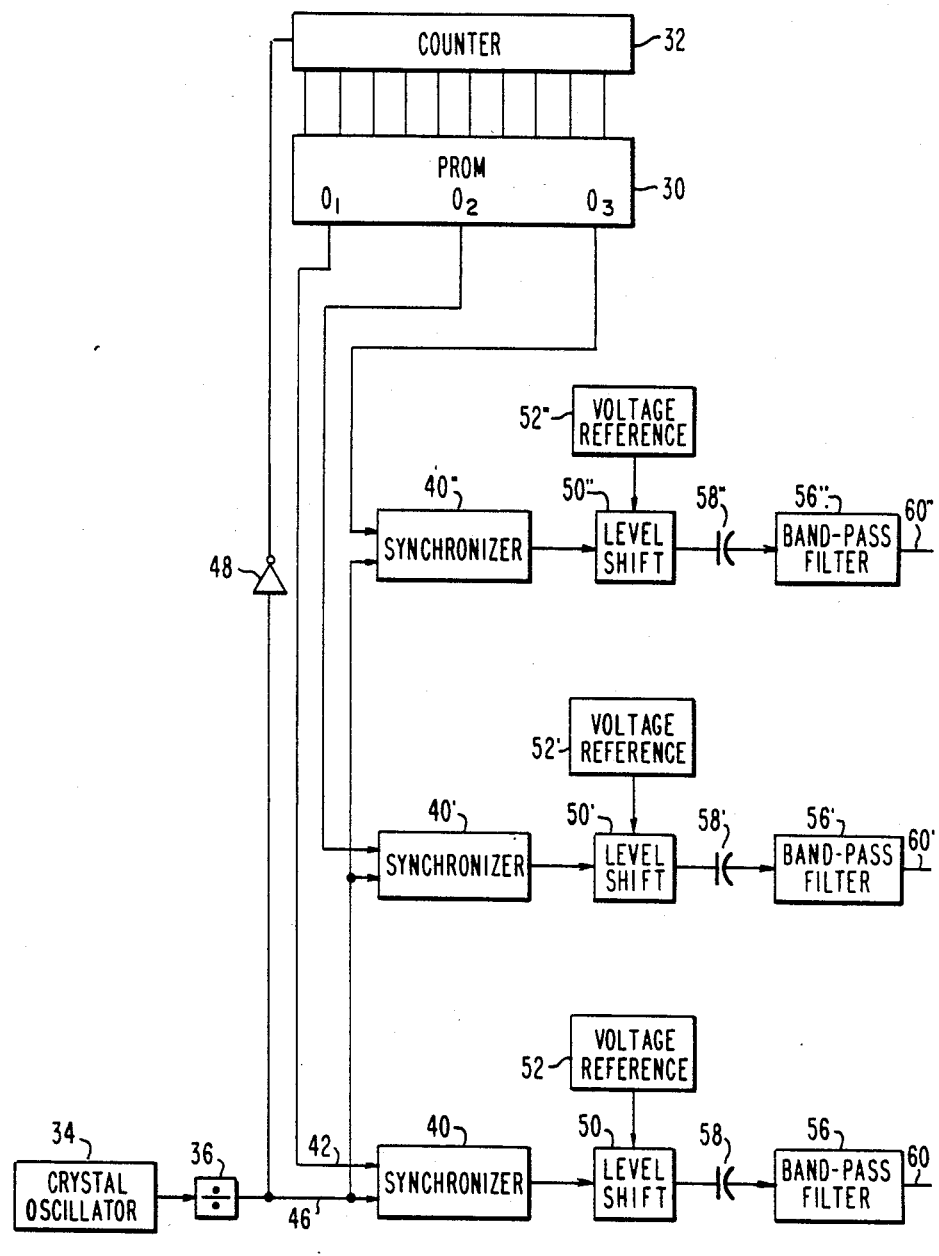
FIG. 9 is a block diagram of another embodiment of the present invention for deriving phase related multiple signals.

The arrangement of FIG. 9 is identical to that of FIG. 3 with the addition of two more outputs, $O_2$ and $O_3$, and two more channels of signal processing including the synchronizing, level shifting and filtering, indicated by respective primed and double-primed counterparts. Depending upon how the information is stored in PROM 30, the band-pass filters 56, 56' and 56" may respectively provide three different 1000 Hz sine waves which bear no particular relationship to one another and which are used for three different tasks. Alternatively, as previously discussed, the bit pattern may be stored such that the sine waves assume a set predetermined phase relationship with respect to one another.

In yet another arrangement, two outputs may be utilized to derive sine waves which are 90 degrees out of phase with respect to one another, thereby providing a sine and cosine, widely used in in-phase and quadrature signal processing systems. For the specific example of a 1024×4 PROM, the bit pattern for the sine wave may be stored in bit position $B_1$ starting with the first word and the identical bit pattern stored in bit location $B_2$ beginning with the 256th word location (and looping around and ending in the 255th location).

Accordingly, there has been described a sine wave generator wherein the sine wave is derived from a stored bit pattern in a digital memory means such a PROM with the contents of the bit locations being read out by a very precise clocking frequency and converted to a continuous pulse waveform under control of the same precise clocking frequency. Any undesired voltage level variations of the pulse waveform are eliminated by shifting it to a very precise voltage level and then filtering it to derive the fundamental frequency. The stored bit pattern is representative of a notched square wave so as to reduce the effects of the odd harmonics, close to the fundamental, so that any slight change in any of the components of the band-pass filter utilized will not appreciably affect the desired fundamental.

Depending upon the size of the memory device utilized, one or more additional frequency and amplitude stabilized sine waves may be provided and may bear some predetermined phase relationship with respect to one another.

We claim:

1. A stable sine wave generator comprising:
   (A) a source of stable clocking pulses;
   (B) counter means responsive to said clocking pulses to provide an output indicative of pulses counted;
   (C) memory means having a plurality of storage locations for storing a predetermined pattern of binary digits;
   (D) said memory means being connected to said counter means to output the binary digit contents of successive storage locations in response to the incrementing of said counter means by said clocking pulses;
   (E) means responsive to said clocking pulses for sampling the binary digits read out of said memory means and including
      (a) a synchronizer having at least first and second input lines and an output line,
      (b) said first input line being connected to receive the binary digit output of said memory means,
      (c) said second input line being connected to receive said clocking pulses to transfer the value of the binary digit on said first input line to said output line,
      (d) a source of stable voltage reference,
      (e) said output line being connected to said source of stable voltage reference to shift the voltage level on said output line, when above a predetermined value, to the value of said voltage reference whereby
   the binary digit pattern is converted into a corresponding pulse waveform; and
   (F) filter means for receiving and filtering said pulse waveform to provide the fundametal frequency sine wave component thereof.

2. Apparatus according to claim 1 wherein:
   (A) at least one other predetermined pattern of binary digits is stored in said memory means; and which includes
   (B) additional means responsive to said clocking pulses for sampling the binary digits of said other pattern and for converting them into a corresponding pulse waveform; and
   (C) additional filter means for receiving and filtering said latter pulse waveform to provide the fundamental frequency sine wave component thereof.

3. Apparatus according to claim 2 wherein:
   (A) said determined patterns of binary digits are selected such that the respective resulting sine waves bear a predetermined phase relationship with respect to one another.

4. Apparatus according to claim 3 wherein:
   (A) said phase relationship between two of said sine waves is 90 degrees to thereby provide a sine and cosine wave.

5. Apparatus according to claim 1 wherein:
   (A) said source of stable clocking pulses includes a high frequency crystal oscillator.

6. Apparatus according to claim 5 which includes:

(A) divider circuitry connected to said crystal oscillator for reducing the high frequency output thereof to a predetermined lower value.

7. Apparatus according to claim 6 wherein:
(A) said lower valued frequency is $f_c$;
(B) the number of addressable storage locations is N; and
(C) $f_s = f_c/N$, where $f_s$ is the frequency of the desired sine wave signal.

8. Apparatus according to claim 1 which includes:
(A) circuit means to insure that the binary digit read out of said memory means is sampled only after the memory location in which it was stored has been addressed, and not during said addressing process.

9. Apparatus according to claim 1 wherein:
(A) said memory means is a read only memory (ROM) which includes a plurality of multi-bit word locations each addressable on a particular output count indication of said counter means;
(B) said ROM also including a separate output for each of said bits of an addressed word.

10. Apparatus according to claim 9 wherein:
(A) said predetermined pattern of binary digits is stored in only one bit location of said plurality of words and only the output associated with that bit location is utilized for outputting to said means for sampling.

11. Apparatus according to claim 9 wherein:
(A) a predetermined pattern for generating a sine wave is stored in more than one of said bit locations.

12. Apparatus according to claim 9 wherein:
(A) a plurality of predetermined patterns is stored in respective ones of said bit locations and a plurality of corresponding outputs are utilized for generating a plurality of sine waves.

13. Apparatus according to claim 1 which includes:
(A) a linear variable differential transformer (LVDT) having a primary winding; and
(B) said primary winding being connected to receive said sine wave.

* * * * *